United States Patent
Huber et al.

(10) Patent No.: US 11,731,283 B2
(45) Date of Patent: Aug. 22, 2023

(54) METHOD FOR CHECKING A SAFETY AREA OF A ROBOT

(71) Applicant: MAGNA STEYR Fahrzeugtechnik AG & Co KG, Graz (AT)

(72) Inventors: Andreas Huber, Stallhofen (AT); Tomaz Kukovec, Makole (SI); Christoph Monschein, Jagerberg (AT)

(73) Assignee: MAGNA STEYR FAHRZEUGTECHNIK GMBH & CO KG, Graz (AT)

( * ) Notice: Subject to any disclaimer, the term of this patent is extended or adjusted under 35 U.S.C. 154(b) by 294 days.

(21) Appl. No.: 17/151,259

(22) Filed: Jan. 18, 2021

(65) Prior Publication Data
US 2021/0237278 A1 Aug. 5, 2021

(30) Foreign Application Priority Data
Feb. 5, 2020 (DE) .......................... 102020201375.6

(51) Int. Cl.
*G05B 15/00* (2006.01)
*B25J 13/06* (2006.01)
(Continued)

(52) U.S. Cl.
CPC .............. *B25J 13/06* (2013.01); *B25J 9/1666* (2013.01); *G06T 11/00* (2013.01); *G06V 20/10* (2022.01); *B25J 9/1671* (2013.01); *B25J 19/0095* (2013.01)

(58) Field of Classification Search
CPC ........ B25J 13/06; B25J 9/1666; B25J 9/1671; B25J 19/0095; G06T 11/00; G06V 20/10
See application file for complete search history.

(56) References Cited

U.S. PATENT DOCUMENTS

2004/0243147 A1* 12/2004 Lipow .................... A61B 34/74
606/130
2009/0319081 A1* 12/2009 Kock ................. G05B 19/4061
901/49
(Continued)

FOREIGN PATENT DOCUMENTS

DE 10128015 A1 12/2001
DE 102004016331 A1 11/2005
(Continued)

*Primary Examiner* — Harry Y Oh
*Assistant Examiner* — Sohana Tanju Khayer
(74) *Attorney, Agent, or Firm* — Jordan IP Law, LLC; Todd A. Vaughn (57) ABSTRACT

A method for checking a safety area of a robot with an augmented reality human machine interface (AR-HMI) that comprises a display and a video camera. The method includes: acquiring, at the AR-HMI, a robot type of the robot, displaying, in the display of the AR-HMI, a virtual robot image of at least part of a robot of the robot type in a manner such that the virtual robot image overlays an actual robot image of the robot of the robot type in the video camera of the AR-HMI, aligning a position of the virtual robot image with a position of the actual robot image by moving the AR-HMI in three-dimensional space, confirming the alignment of the position between the virtual robot image and the actual robot image, and displaying a virtual first safety cell area around the virtual robot image in the confirmed position as an overlay of the actual robot image in the display of the AR-HMI.

19 Claims, 3 Drawing Sheets

(51) Int. Cl.
    *B25J 9/16*     (2006.01)
    *G06T 11/00*     (2006.01)
    *G06V 20/10*     (2022.01)
    *B25J 19/00*     (2006.01)

(56) References Cited

U.S. PATENT DOCUMENTS

| | | | | |
|---|---|---|---|---|
| 2016/0158937 A1* | 6/2016 | Kamoi | ................... | B25J 9/1605 |
| | | | | 901/5 |
| 2016/0229052 A1* | 8/2016 | Touma | ................... | B25J 9/1658 |
| 2017/0210008 A1* | 7/2017 | Maeda | ................... | B25J 9/1666 |
| 2019/0063907 A1* | 2/2019 | Grau | ................... | G01B 5/0009 |
| 2019/0208979 A1* | 7/2019 | Bassa | ................... | A47L 11/4038 |
| 2019/0329405 A1* | 10/2019 | Atohira | ................... | G06F 3/012 |
| 2019/0389066 A1* | 12/2019 | Jung | ................... | G02B 27/0093 |
| 2020/0070347 A1* | 3/2020 | Denenberg | ............ | B25J 9/1674 |
| 2020/0156258 A1* | 5/2020 | Watanabe | ............... | G06F 3/011 |
| 2021/0154826 A1* | 5/2021 | Watanabe | ............... | B25J 19/04 |
| 2021/0154844 A1* | 5/2021 | Ooba | ................... | B25J 19/023 |
| 2021/0187745 A1* | 6/2021 | Yang | ..................... | B25J 9/1671 |

FOREIGN PATENT DOCUMENTS

| | | |
|---|---|---|
| DE | 102004046144 A1 | 3/2006 |
| DE | 102005009437 A1 | 9/2006 |
| DE | 102005011126 A1 | 9/2006 |
| DE | 102016000105 A1 | 7/2016 |
| DE | 102017207894 A1 | 11/2018 |
| DE | 102017207995 A1 | 11/2018 |

\* cited by examiner

METHOD FOR CHECKING A SAFETY AREA OF A ROBOT

CROSS-REFERENCE TO RELATED APPLICATIONS

The present application claims priority 35 U.S.C. § 119 to German Patent Publication No. DE 102020201375.6 (filed on Feb. 5, 2020), which is hereby incorporated by reference in its complete entirety.

TECHNICAL FIELD

One or more embodiments relate to a method for checking a safety area of a robot.

BACKGROUND

Input and/or output interfaces of computers are known under the name of "human machine interface" (HMI). In addition to classic devices such as screen, keyboard and mouse, in more recent times mobile devices and output devices that similar to glasses can be placed on the head have also become known, in particular for the display and/or for the interaction with virtual worlds or virtual reality (VR) or with extended realities, augmented reality (AR).

Modern industrial robots can comprise a planned safety configuration, which relates to a respective robot and can be stored at it. The safety configuration can comprise partial objects that describe safety-relevant spaces or cells around the robot or around specific points of the robot via different three-dimensional geometric forms. The specified safety planning for restricting the maximum working space of the robot is not visible with the naked eye for commissioners, nor for robot programmers, plant or operating personnel.

Here, a distinction can be made between the following types of partial objects of the safety configuration or the geometric shapes: firstly, geometric objects whose reference point for further shaping and positioning is located in the robot base, namely the safe cell space or safety cell area, and, on that basis, the working space and protected space, and secondly, geometric objects whose reference point for further shaping and positioning is located at the flange centre point of the robot, i.e. at the end point of the robot on which a tool is mounted, namely the safe tool space or "safe tool."

At present, the respective safety plans of an industrial robot can either be shown graphically at an operating handset of the robot, or at a computer via suitable simulation software. The second option has the advantage that not only the robot itself but also the entire robot cell can be fed into a graphic illustration.

The disadvantage of both of the presently existing possibilities for displaying the safety configuration planned at the robot is that they do not enable any direct context for the real robot cell.

As a result, the evaluation of the safety planning made for the industrial robot is at present a very time-consuming process, since all the relevant values that have an effect, such as the robot and its safety planning, separating protective equipment such as safety fences and safety gates, and further objects of the robot cell must be transferred into a virtual installation model. Even the fact that the virtual installation model could not exactly correspond to the robot cell that exists physically leaves a residual fuzziness and uncertainty with respect to verification and validation of the planned safety configuration.

SUMMARY

It is an object of the invention to specify a method for checking a safety area of a robot that optimizes the workflow of a checking and/or acceptance of safety plans of industrial robots.

The object is achieved by a method for checking a safety area of a robot with an augmented reality human machine interface (AR-HMI) by a user of the AR-HMI, wherein the AR-HMI comprises a display and a video camera, the method comprising: acquiring the robot type of the robot at the AR-HMI; displaying a virtual robot image of at least part of a robot of the robot type in the display of the AR-HMI, such as of an area of a robot base as far as the axis 2 of the robot, wherein displaying the virtual robot image comprises overlaying a real or actual image of the video camera of the AR-HMI in the display of the AR-HMI, wherein the real or actual image comprises a real robot image of a robot of the robot type; moving, via a user, the AR-HMI, in particular of the camera of the AR-HMI, in space, in a manner such that the virtual robot image is brought into positional alignment with the real robot image; confirming, by the user, the positional alignment between the virtual robot image and the real robot image to the AR-HMI and/or the AR-HMI recognizes/confirms the positional alignment; and displaying a virtual first safety cell area around the virtual robot image in the confirmed position as an overlay of the real or actual image in the display of the AR-HMI.

In accordance with one or more embodiments, an augmented reality device or a mixed reality device and software are used. Through use of the AR-HMI, which comprises data glasses, particularly a HoloLens system from Microsoft, virtual safety cell areas existing in software, in particular, safety plans or planned safety configurations, of industrial robots are projected into a physically existing robot cell or are overlaid thereon in which the corresponding robot is installed. For the optimum overlaying and thus for the correct display of the safety cell area, the user of the AR-HMI can bring into alignment or compare a virtual robot image that is shown to him by changing the real camera image and thus the real robot image, until there is positional alignment between the two images, and confirm this alignment to the AR-HMI. Alternatively, the AR-HMI can also recognize or confirm the positional alignment autonomously. An automatic, in particular, pictorial and/or contour-based, recognition and/or confirmation of the alignment of the objects can thus take place.

The virtual data relating to the robot and its safety areas are hereby compared with the physical installation of the robot, so that the exact true position of a safety cell area can be displayed. A virtual first safety cell area is shown to the user around the virtual robot image in the confirmed position as an overlay of the real or actual image in the display of the AR-HMI. The user is then able to move in space, in any desired way, around the robot with the AR-HMI, and to assess the truly present objects with reference to the displayed virtual safety cell area. In this way, existing real clearances or problems arising due to clearances from the safety zones that are absent or are too low can be ascertained by the user.

In accordance with one or more embodiments, the method can also contribute to establishing safety limitations on the maximum possible working space of an industrial robot via software measures on the part of the robot controller instead of, as is nowadays usual, limiting the maximum possible working space through fixed mechanical stops on axes of the robot.

A safe space, in particular, a safety plan, of industrial robots via AR-HMI, for example, via a HoloLens from Microsoft, can be thus visualized by the solution according to the invention. It is possible to combine the three-dimensional geometric objects of the planning of the safety configuration generated at the industrial robot and usually only stored there, with the real robot cell via AR-GUI, in particular via a Microsoft HoloLens.

Through the combination of the safety configuration planned at the robot via software with the physically existing robot cell in which it is installed allows the previously described disadvantages in terms of the effort and fuzziness of the safety cell to be overcome.

The terms "robot" and "robot image" can here relate exclusively to a positionally fixed part of a complete robot, in particular, to a plinth of the robot.

Further developments of the invention are given in the dependent claims, in the description and in the appended drawings.

In accordance with one or more embodiments, in order to be able to display the exact true position of a safety cell area, as described previously, virtual data about the robot and its safety areas are compared with the physical installation of the robot. This comparison, position matching, can be sufficient for the display of the safety cell areas/spaces, in particular of the first and second safety cell area, of a working space and/or of a protected space.

Optionally, at least one current axis position of the real robot can be taken into consideration in the illustration of the virtual first and/or second safety cell area and/or of the working space and/or of the protected space, in particular, after reading the axis position, such as the axis position of the axis 1 of the robot.

In accordance with one or more embodiments, the virtual first safety cell area has essentially the shape or cross-section of a cube or a cuboid or a prism. The ground plan of the safety cell area can have more than four corner points.

In accordance with one or more embodiments, the acquisition of the robot type of the robot at the AR-HMI takes place in that a physical identifier of the robot type is captured with the video camera of the AR-HMI, or that the user selects the robot type at the AR-HMI. The physical identifier of the robot type can be an alphanumeric label of the robot type or, for example, a QR code.

In accordance with one or more embodiments, in addition to the virtual first safety cell area, a virtual second safety cell area is displayed around the virtual robot image in the confirmed position as an overlay of the real or actual image in the display of the AR-HMI, wherein the second safety cell area has a defined distance, which can be freely configurable by the user, from the first safety cell area. The virtual second safety cell area has the same shape or cross-section as the virtual first safety cell area. The virtual second safety cell area can concern a zone with further increased safety, for example, in order to be able to give consideration to a switch-off delay or inertia of the system.

In accordance with one or more embodiments, both the first and the second safety cell area can be displayed or hidden at will.

In accordance with one or more embodiments, a planned safety configuration is read by the AR-HMI from a data memory or is transmitted to the AR-HMI, so that the virtual first safety cell area can be created on the basis of the planned safety configuration.

In accordance with one or more embodiments, the AR-HMI comprises at least one stationary computer and at least one mobile computer. The mobile computer comprises the display and the video camera and is designed as AR glasses, particularly as a HoloLens from Microsoft. More comprehensive calculations are performed using the stationary computer.

In accordance with one or more embodiments, current axis positions of the robot are acquired at the AR-HMI.

In accordance with one or more embodiments, the current axis positions are transmitted from the robot to the AR-HMI, or that a display of the current axis positions is acquired by the video camera of the AR-HMI.

In accordance with one or more embodiments, a flange centre point of the robot is determined from the current axis positions, via forward transformation, in particular, via forward transformation according to Denavit-Hartenberg.

In accordance with one or more embodiments, at least one virtual safe tool space is displayed around the flange centre point as an overlay of the real or actual image in the display of the AR-HMI, wherein the safe tool space essentially forms a sphere.

DRAWINGS

Embodiments will be illustrated by way of example in the drawings and explained in the description below.

DESCRIPTION

Figure 1:
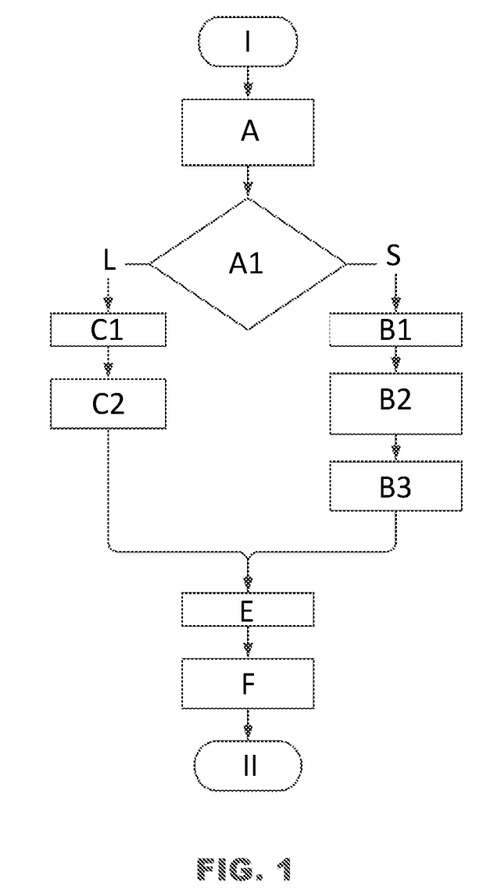
FIG. 1 illustrates a schematic flow diagram of a method, in accordance with one or more embodiments.
Figure 2:
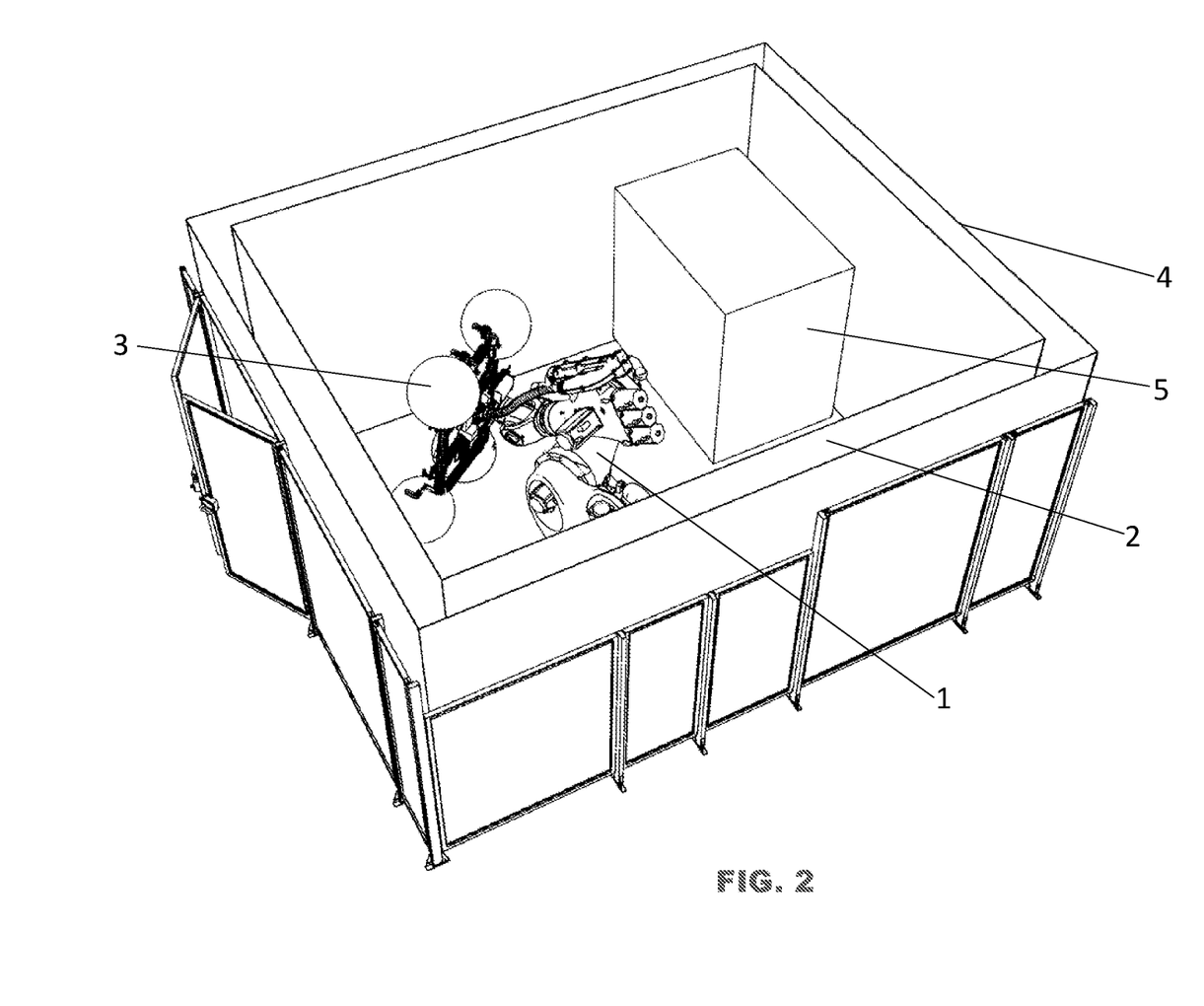
FIG. 2 illustrates a schematic three-dimensional view of a robot and its surroundings, namely a robot cell, with virtual safety cell areas that have been determined in accordance with one or more embodiments.

FIGS. 1 and 2 illustrates, in accordance with one or more embodiments, a method for checking a safety area of a robot 1 with an augmented reality human machine interface (AR-HMI) by a user of the AR-HMI. The robot 1 and its surroundings, in particular, a robot cell and a virtual first safety cell area 2, and a virtual second safety cell area 4, is illustrated in FIG. 2.

Figure 3:
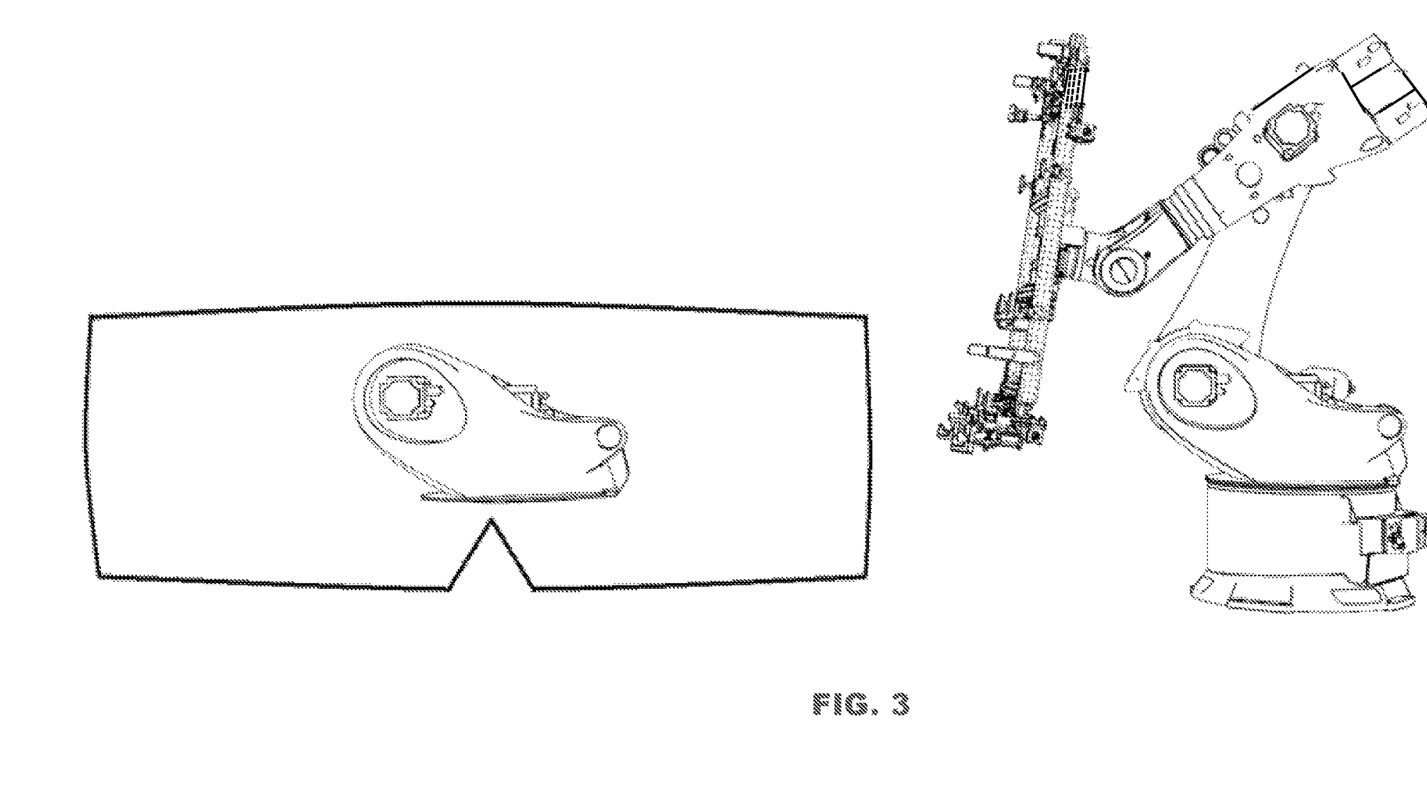
FIG. 3 illustrates a schematic illustration of the position matching in a method in accordance with one or more embodiments.

FIG. 3 schematically illustrates how the optical matching, the positional determination, takes place in a method in accordance with one or more embodiments. The virtual robot plinth, such as an area of a robot base up to an axis 2, illustrated on the left in FIG. 3, is overlaid via HoloLens with the robot plinth physically installed in the cell, shown on the right in FIG. 3.

As illustrated in FIG. 1, the method comprises one or more process blocks A, B, and C in which a safety configuration of a robot is transmitted to an AR-HMI, in particular, to a HoloLens, either by downloading or by scanning a robot display. Subsequent matching, in particular, optical matching, of the virtual robot base/plinth with the robot that is truly located/positioned in the processing/robot cell, E. Subsequently, display of the safe cell spaces/areas on the HoloLens or made visible to the eye around the real robot, F.

In detail, in accordance with one or more embodiments, the method comprises: at process block I, initiating a start of the method; at process block A, selecting the robot; at process block A1, acquiring data for AR-HMI; at process block S, scanning/reading the data; at process block L, loading/transmitting; at process block B1, acquiring (reading) the robot type of the robot at the AR-HMI; at process block B2, acquiring (reading) current axis positions of the robot at the AR-HMI; at process block B3, acquiring (reading) safety configuration, at process block C1, loading the robot archive; at process block C2, loading the safety configuration; at process block E, bringing/matching the virtual robot image into positional alignment with the real/ actual robot image; at process block F, displaying safety areas, such as, a virtual first safety cell area and/or of a virtual safe tool space, at process block II, ending the method.

The method thus comprises: acquisition of the robot type of the robot 1 at the AR-HMI (A, B, C), wherein the acquisition of the robot type comprises an acquisition, in particular, reading, of the robot type of the robot at the AR-HMI (B1), or loading of the robot type from a robot archive (C1); display of a virtual robot image of at least part of a robot of the robot type in the display of the AR-HMI, wherein the display of the virtual robot image overlays a real or actual image of the video camera of the AR-HMI in the display of the AR-HMI, and the real or actual image comprises a real or actual robot image of the robot 1 of the robot type, wherein the user brings the virtual robot image into positional alignment with the real robot image by moving the AR-HMI in space, E, i.e. carries out a "position matching," wherein the user confirms the positional alignment between the virtual robot image and the real robot image to the AR-HMI, and/or the AR-HMI recognizes or confirms the positional alignment, and display of a virtual first safety cell area 2, F, around the virtual robot image in the confirmed position as an overlay of the real or actual image in the display of the AR-HMI.

A planned safety configuration can be read for this purpose by the AR-HMI from a data memory or transmitted to the AR-HMI, (C2, B3), so that the virtual first safety cell area 1 can be created on the basis of the planned safety configuration. In addition, current axis positions of the robot 1 can be acquired at the AR-HMI, B2, in that the current axis positions are transmitted from the robot 1 to the AR-HMI or that a display of the current axis positions is acquired by the video camera of the AR-HMI.

The current axis positions can additionally be used for the positional determination, for position matching, of the robot. The current axis positions, such as at least the axis position of the axis 1 of the robot, can be taken into consideration for the display of the virtual first safety cell area 2 and/or of a second safety cell area 4 and/or of a working space and/or of a protected space 5, in particular, for positioning a reference coordinate system in the robot base and/or for determining the robot base. The geometric objects of the planned safety configuration such as, for example, the first safety cell area 2 and the second safety cell area 4, or the working space of the respective robot, can be stored for this reference point.

It is not necessary for the matching process itself to read a current axis position from the robot. The position of the robot determined via matching can, however, be supplemented by current axis positions, when taking the axis geometries such as angle, length, rotation etc. into consideration, in order to specify positions for reference coordinate systems, for the robot base or for the end effector. A flange centre point can in particular be determined from the current axis positions.

At least one virtual safe tool space 3 can be displayed around the flange centre point as an overlay of the real or actual image in the display of the AR-HMI, F, wherein the safe tool space 3 preferably essentially forms a sphere.

Altogether the following virtual safety areas can, for example, be displayed as an overlay of the real or actual image in the display of the AR-HMI: safe cell space, i.e. safety cell area, safe working space, safe protected space, safe tool space, safe TCP measurements. A "working space" can, for example, be a space made visible via glasses/ HoloLens around the safe tool spaces 3 or spaces of the safe tools 3, for example, a cuboid over the four spheres 3 displayed in the cell space, in order to define a space out of which the robot does not move. This is, for example, necessary, so that an operating person can exchange tools at the robot flange and while doing so obtains knowledge of how closely he can approach the robot or robot flange. A "protected space" on the other hand is a space in which an operating person is always safe, since the protected space defines a space in the cell area into which the robot cannot enter according to its planned safety configuration. See, for example, the cuboid which is illustrated in FIG. 2 in the cell area to the right next to the robot and which represents a protected space 5.

A HoloLens from Microsoft can be used, for example, as the AR-HMI. The AR-HMI is also referred to below as "glasses."

One possible implementation of a method in accordance with one or more embodiment is described below.

A plurality, such as, for example, three items of information can be necessary for the display of complete safety configurations: robot type, current axis position of the robot, and robot safety configuration.

Concerning the Robot Type:

A database containing virtual robot types can be created during a programming phase. This can, for example, comprise CAD models of different robot manufacturers, such as those made by KUKA, ABB or FANUC. In order to be able to calibrate the glasses to the physically existing robot, the virtual equivalent of the particular robot geometry that is to be overlaid is required. The information regarding the robot to be represented is either transferred to the glasses via reading the robot backup, or is determined by directly reading a QR code or the type plate on the physically existing robot itself. Through a selection, by the operator of the glasses, of the robot model made available in the glasses via a selection menu, a matching process between the virtual robot model and the real robot is started. This is done through projection/overlay of the virtual robot plinth (preferably the area from the robot base to the axis 2) onto its real counterpart. With this, the glasses attempt to find the virtual geometry of the robot plinth in the real surroundings. To achieve this, the glasses operator must overlay the robot plinth projected via the glasses as closely as possible on the real plinth. As soon as the necessary correspondences between the virtual and real plinth geometry have been established, the matching process is positively completed. The conclusion of the matching process must be confirmed by the glasses operator, for example via gestures, hand movement, and so forth.

Concerning the Current Axis Position of the Robot:

The current positions (rotary as well as linear) of the individual axes of the respective robot are required for positioning the robot origin (reference coordinate system) and the position of its end effector, as well as its tool centre point or flange centre point of the robot. These are either automatically drawn from the robot backup or are read by the glasses from the display of the operating handset of the real robot.

After the actual position of the real robot has been ascertained via the preceding matching process, the reference coordinate system is positioned on the basis of the current axis positions of the real robot for further visual display of the geometric objects planned in the safety configuration in the robot base. Through forward transformation of the coordinate system of the robot base according to Denavit-Hartenberg, the position of the reference coordinate system of the end effector is subsequently ascertained. Through this, the reference position, preferably a flange centre point, is specified for further positioning of the geometric objects defined in the safety planning of the robot for representation of the "safe end effector" or safe tools.

The optical matching process can thus be sufficient on its own to determine the robot position. It is, for example, possible for the matching not to relate to a movable part of the robot, but to a stationary part of the robot, for example to the robot base, so that the reference coordinate system of the robot base or the actual position of the robot base is already specified with the matching, or that no forward or backward transformation is any longer necessary for its positioning. The virtual first and second safe cell areas, as well as the working spaces and protected spaces, can thereupon be displayed. The forward transformation and the reading of axis positions, in particular of all axis positions, can be applied to this end to ascertain the reference coordinate system of the end effector.

In addition to the optical matching, it can be provided that the reference coordinate system is positioned in the robot base, as described previously, wherein the reading of the current position of the axis 1 of the robot B2, C1 is additionally applied for positional determination. When, in particular, a movable part of the robot is matched in the matching process, the safe cell areas cannot yet be displayed, since when matching a part of the robot that is movable when the robot is operating, for example of the area from the robot base up to the axis 2, while the actual position of this movable part of the robot has indeed been ascertained, the actual position or the coordinates of the robot origin or the reference point in the robot base has not. The robot can, for example, be rotated about the axis 1. Thus in order to now define the robot origin or the base, or in order to position the reference coordinate system of the robot base for display of the geometric objects stored in the safety planning—such as the first and second safe cell areas, working spaces, protected spaces, those axis positions, which are located between the matched robot part and the robot origin or reference point in the robot base, for example the area of the robot base to the axis 2, must be read—preferably in the rotary as well as the linear sense.

In order to deduce the reference coordinate system of the end effector from the actual position, "recognized" via optical matching, of the real robot, preferably the positions, and particularly preferably the geometries, of axes, preferably of all axes, are therefore read, or the geometric chain up to the flange centre point is ascertained.

The position of the reference coordinate system of the end effector is necessary for the display of the safe tools. The positions of one or more, preferably of all of the, axes of the robot must be read, B2, C1, in order to determine this reference position. A display of the safe tools or spaces of the safe tools (spheres) can then take place.

Regarding the Robot Safety Configuration:

After specifying and determining the reference positions for positioning and aligning the geometric objects defined in the safety planning, the relevant values for determining the required geometric objects must be read from the safety configuration of the robot. This contains all the necessary parameters and numerical values for graphical display and projection of the virtual 3D objects via glasses. The reference coordinate system of the robot base for determining the robot base serves for the projection of the safe cell area, safety spaces and working spaces. The reference coordinate system for the definition of the tool centre point or flange centre point of the end effector is additionally necessary or is used for the display of the "safe tools."

Verification and Validation Via Glasses:

The matching, positioning and projection process are followed by the verification and validation of the prevailing safety situation in the real robot cell. The safe cell area of the robot is displayed in green for this purpose, and is projected into the real cell. For better and unambiguous display of the minimum necessary safety clearance between the virtual cell space of the robot and the really existing physical housing, this boundary area is additionally displayed in red. The distance between these two cell areas is freely configurable. The safety validation is simplified and made easier through the simultaneous display of the two virtual cell spaces. The projected cell areas can be displayed and hidden at any time in the selection menu of the glasses. The selection possibility for the display of the safe tools via glasses is also found in the selection menu of the glasses. After selecting the appropriate safe tool, this is overlaid on the physically existing tool in the geometric form specified in the safety planning of the robot. The geometric objects for the display of the safe tool are displayed transparently in white. The glasses operator can thereby check whether the geometric objects satisfy all the predefined and relevant safety specifications. A further menu serves for the selection of planned working spaces and safety spaces (e.g. safe cell area, protected space). These are then correspondingly displayed or hidden in the predefined three-dimensional geometric form. The glasses wearer/glasses operator can preferably freely select whether at any given moment he wants to display the virtual safe cell areas 2, 4, the virtual space of the safe tools 3, virtual working space and/or virtual protected space 5. All the colours used to display the different geometric elements are freely configurable.

Additional Options:

The option of projecting the safety configuration of a plurality of robots simultaneously via the glasses and of overlaying it on the respective real environment is furthermore available.

The possibility of connecting the glasses directly to the robot is a further option. The current actual values of its axis positions are then read cyclically and transmitted to the glasses. As a further consequence, this enables the dynamic display of the spatial volume required by the safe end effector or safe tool planned at the robot via glasses. The virtual spatial volume of the safe end effector including the robot generated thereby can as a further consequence be checked against the safe cell space planned at the robot as well as against the real robot cell. The possibility of performing and visualizing a measurement between virtual and/or real objects is finally provided.

The terms "coupled," "attached," "fastened," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Robot
2 Virtual first safety cell area
3 Virtual safe tool space
4 Virtual second safety cell area
5 Protected space
I Start
A Selection of a robot
A1 Acquisition of data for AR-HMI
S Scanning/reading
L Load/transmit
B1 Acquire (read) the robot type of the robot at the AR-HMI
B2 Acquire (read) current axis positions of the robot at the AR-HMI
B3 Acquire (read) safety configuration
C1 Load the robot archive
C2 Load the safety configuration
E Bring/match the virtual robot image into positional alignment with the real robot image
F Display safety areas (virtual first safety cell area and/or virtual safe tool space)
II End

What is claimed is:

1. A method for checking a safety area of a robot with an augmented reality human machine interface (AR-HMI) that comprises a display and a video camera, the method comprising:
    acquiring, at the AR-HMI, a robot type;
    displaying, in the display of the AR-HMI, a virtual robot image of at least part of a robot of the acquired robot type in a manner such that the virtual robot image overlays an actual robot image of the robot of the acquired robot type in the video camera of the AR-HMI;
    aligning a position of the virtual robot image with a position of the actual robot image by moving the AR-HMI in three-dimensional space;
    confirming the alignment of the position between the virtual robot image and the actual robot image;
    displaying, in response to confirming the alignment of the position, a virtual first safety cell area around the virtual robot image in the confirmed position as an overlay of the actual robot image in the display of the AR-HMI for positioning a reference coordinate system in a base of the robot;
    displaying a virtual second safety cell area around the virtual robot image in the confirmed position as an overlay of the real or actual image in the display of the AR-HMI for positioning the reference coordinate system in the base of the robot; and
    displaying a working space and a protected space, taking into consideration at least one current axis position of the robot, for positioning the reference coordinate system in the base of the robot.

2. The method of claim 1, wherein the virtual first safety cell area has a shape of a cube, or a cuboid, or a prism.

3. The method of claim 1, wherein acquiring the robot type comprises capturing a physical identifier of the robot type with the video camera of the AR-HMI, the physical identifier of the robot type comprising an alphanumeric label of the robot type.

4. The method of claim 1, wherein the virtual second safety cell area has a defined distance from the virtual first safety cell area.

5. The method of claim 1, further comprising, before displaying the virtual first safety cell area and/or the virtual second safety cell area, reading, by the AR-HMI, a planned safety configuration from a data memory, and then displaying the virtual first safety cell area and/or the virtual second safety cell area based on the planned safety configuration.

6. The method of claim 1, further comprising, before displaying the virtual first safety cell area and/or the virtual second safety cell area, transmitting to the AR-HMI a planned safety configuration, and then displaying the virtual first safety cell area and/or the second safety cell area based on the planned safety configuration.

7. The method of claim 1, wherein:
    the AR-HMI further comprises at least one stationary computer and at least one mobile computer, and
    the at least one mobile computer comprises the display and the video camera.

8. The method of claim 7, wherein the at least one mobile computer comprises as augmented reality (AR) glasses.

9. The method of claim 1, further comprising acquiring current axis positions of the robot, via transmission from the robot to the AR-HMI, or via the video camera of the AR-HMI.

10. The method of claim 9, further comprising determining, using the current axis positions, a flange centre point via forward transformation.

11. The method of claim 10, further comprising displaying at least one virtual safe tool space, having a spherical shape, around the flange centre point as an overlay of the actual robot image in the display of the AR-HMI.

12. The method of claim 1, further comprising displaying at least one working space in the display of the AR-HMI.

13. The method of claim 1, further comprising displaying at least one protected space in the display of the AR-HMI.

14. The method of claim 3, wherein the physical identifier of the robot type comprises a QR code.

15. The method of claim 1, wherein acquiring the robot type comprises a user selecting the robot type at the AR-HMI.

16. A method for checking a safety area of a robot, the method comprising:
    acquiring a robot of a specific robot type via an augmented reality human machine interface (AR-HMI) that comprises a display and a video camera;
    displaying, in the display of the AR-HMI, a virtual robot image of an area of a base of the acquired robot in a manner such that the virtual robot image overlays an actual robot image of the acquired robot in the video camera of the AR-HMI;
    aligning a position of the virtual robot image with a position of the actual robot image by moving the AR-HMI in three-dimensional space;
    confirming the alignment of the position between the virtual robot image and the actual robot image;
    displaying a virtual first safety cell area and a virtual second safety cell area around the virtual robot image in the confirmed position as an overlay of the actual robot image in the display of the AR-HMI for positioning a reference coordinate system in a base of the acquired robot;

displaying a working space and a protected space, taking into consideration at least one current axis position of the acquired robot, for positioning the reference coordinate system in the base of the acquired robot.

17. The method of claim 16, wherein acquiring the robot type comprises capturing a physical identifier of the robot type with the video camera of the AR-HMI, the physical identifier of the robot type comprising an alphanumeric label of the robot type.

18. The method of claim 17, wherein the physical identifier of the robot type comprises a QR code.

19. The method of claim 16, wherein acquiring the robot type comprises a user selecting the robot type at the AR-HMI.

\* \* \* \* \*